US005908655A

United States Patent [19]
Doucet

[11] Patent Number: 5,908,655
[45] Date of Patent: Jun. 1, 1999

[54] SHORTENING SYSTEM, PRODUCTS THEREWITH, AND METHODS FOR MAKING AND USING THE SAME

[75] Inventor: Jim Doucet, Olathe, Kans.

[73] Assignee: Danisco A/S, Copenhagen, Denmark

[21] Appl. No.: 08/955,214

[22] Filed: Oct. 21, 1997

[51] Int. Cl.⁶ .................................................... A23D 9/00
[52] U.S. Cl. ........................................ 426/606; 426/607
[58] Field of Search ..................................... 426/606, 607

[56] References Cited

U.S. PATENT DOCUMENTS

| | | |
|---|---|---|
| 2,132,437 | 10/1938 | Richardson et al. . |
| 2,442,534 | 6/1948 | Eckey . |
| 3,623,888 | 11/1971 | Reid . |
| 3,914,452 | 10/1975 | Norris . |
| 3,943,259 | 3/1976 | Morris ........................................ 426/24 |
| 4,018,806 | 4/1977 | Wyness et al. . |
| 4,055,679 | 10/1977 | Kattenberg .............................. 426/607 |
| 4,137,338 | 1/1979 | Gawrilow . |
| 4,154,749 | 5/1979 | Krawack . |
| 4,226,894 | 10/1980 | Gawrilow . |
| 4,234,606 | 11/1980 | Gawrilow . |
| 4,263,216 | 4/1981 | Volpenhein . |
| 4,335,157 | 6/1982 | Varvil . |
| 4,366,181 | 12/1982 | Dijkshoorn .............................. 426/607 |
| 4,386,111 | 5/1983 | Van Heteren ........................... 426/607 |
| 4,425,371 | 1/1984 | Stratman ................................. 426/607 |
| 4,501,764 | 2/1985 | Gercama ................................. 426/607 |
| 4,510,167 | 4/1985 | Schmidt ................................. 426/607 |
| 4,567,056 | 1/1986 | Schmidt ................................. 426/607 |
| 4,596,714 | 6/1986 | Brabbs . |
| 4,656,045 | 4/1987 | Bodor et al. . |
| 4,732,767 | 3/1988 | Seiden et al. . |
| 4,865,866 | 9/1989 | Moore . |
| 4,889,740 | 12/1989 | Price ...................................... 426/606 |
| 4,961,951 | 10/1990 | Crosby .................................... 426/606 |
| 5,061,506 | 10/1991 | Leach . |
| 5,064,670 | 11/1991 | Hirshorn et al. . |
| 5,110,509 | 5/1992 | Peter et al. . |
| 5,211,981 | 5/1993 | Purves .................................... 426/606 |
| 5,215,779 | 6/1993 | Dake et al. . |
| 5,254,356 | 10/1993 | Busken . |
| 5,316,927 | 5/1994 | Zaks et al. . |
| 5,407,695 | 4/1995 | Wheeler et al. . |
| 5,434,280 | 7/1995 | Peter et al. . |
| 5,439,700 | 8/1995 | Cain ....................................... 426/607 |
| 5,458,910 | 10/1995 | Gruetzmacher et al. . |
| 5,470,598 | 11/1995 | Scavone . |
| 5,589,216 | 12/1996 | Guskey et al. . |
| 5,612,080 | 3/1997 | Gruetzmacher et al. . |
| 5,718,938 | 2/1998 | Cain ....................................... 426/606 |
| 5,756,143 | 5/1998 | Cain ....................................... 426/607 |

FOREIGN PATENT DOCUMENTS 1078353 11/1993 China .
291240 6/1991 Germany .

OTHER PUBLICATIONS

Elias, B.A., Food Ingredients Europe: Conference Proceedings, London, Oct. 1994.
Willit, W.C., Lancet, 341 (8845), pp. 581–585 (1993).
Khosla et al., J. Amer. College of Nutrition, Aug. 1996, 15(4), pp. 325–339.
Feuge et al., Modification of Vegetable Oils VI: The Practical Preparation of Mono and Diglycerides, Oil and Soap, 23 (259–264), 1946.
Lauridsen, "Food Surfactants, Their Structure and Polymorphism," Technical Paper TP 2–le, Danisco Ingredients, Braband Denmark.
Handbook of Food Additives, 2nd Edition, vol. 1, Chapter 9, Surface Active Agents, pp. 397–429.
Bailey's Industrial Oil and Fat Products, 4th Edition, vol. 2, Chapter 4, pp. 130–147.
Krog, "Interactions of Surface–Active Lipids with Water, Protein and Starch Components in Food Systems," Technical Paper TO 3–le, Danisco Ingredients, Braband, Denmark.

*Primary Examiner*—Carolyn Paden
*Attorney, Agent, or Firm*—Frommer Lawrence & Haug LLP; Thomas J. Kowalski

[57] ABSTRACT

Disclosed and claimed are shortening systems and methods for making and using the shortening system The shortening system can contain vegetable oil and a stearine fraction obtainable from the glycerolysis of a saturated fat or oil, such as a stearine fraction enriched with diglycerides, or at least one monoglyceride and/or diglyceride such as one which is normally solid at room temperature and/or such as one which is enriched with diglyceride. The shortening system has a synergistic amount of solids and crystal matrices and has surprisingly superior properties and imparts those surprisingly superior properties to food products, as well as provides food products with improved organoleptic properties. Chemically leavened and yeast-raised bakery products (e.g., savory crackers, biscuits basecakes, cookies etc.) which incorporate the shortening system so as to allow substantial nutritional improvements over partially hydrogenated fats while giving organoleptically improved properties are disclosed. The incorporation of the mono and diglyceride fractions into non-hydrogenated oils provide the formation of crystal matrices which allow functional aspects of the shortening system such as improved eating qualities (texture/taste) and improved stability in both the processing and the finished product, without the incorporation of positional and geometrical (trans) isomers of unsaturated fatty acids common to partially hydrogenated fats.

37 Claims, No Drawings

SHORTENING SYSTEM, PRODUCTS THEREWITH, AND METHODS FOR MAKING AND USING THE SAME

FIELD OF THE INVENTION

The present invention relates to a shortening system, products containing or produced with the shortening system, and methods for making and using the shortening system.

More in particular, the present invention relates to a shortening system comprising an admixture of at least one non-hydrogenated vegetable oil and at least one stearine fraction obtainable from glycerolysis/interesterification of a fat or oil, or a shortening system comprising an admixture of at least one non-hydrogenated vegetable oil and mono- and diglycerides comprised predominantly of saturated acyl fatty acids, e.g., lauric, myristic, palmitic, stearic and combinations thereof; and, to methods for making, and uses, of such a shortening system, including products containing or having been prepared with such a shortening system.

The present invention further relates to a shortening system which contains crystal matrices, imparts improved organoleptic properties and stability to foodstuff containing the shortening system, and has a conserved level of trans isomers with respect to the fat or oil prior to glycerolysis/interesterification. That is, the amount of trans isomers in the fat or oil is not increased by the glycerolysis/interesterification reaction; and, is not increased by admixing the stearine fraction with non-hydrogenated oil. Thus, the present invention relates to a shortening system which can be used in place of a partially hydrogenated shortening system in present shortening system applications, thereby providing, for instance, healthier foodstuffs.

Various documents are cited in the following text. Each of the documents cited herein, and each of the references cited in each of those various documents, is hereby incorporated herein by reference. None of the documents cited in the following text is admitted to be prior art with respect to the present invention.

BACKGROUND OF THE INVENTION

Currently in the U.S., partially hydrogenated fats are employed in the production of many chemically leavened and yeast-raised bakery products (e.g., cakes, crackers, cookies). The partial hydrogenation of domestic oils originating from soybean, cottonseed, corn, sunflower, and/or canola allow the chemical reduction of the unsaturated fatty acids to saturated fatty acids which provide greater oxidative stability.

Hydrogenation is a physical modification of these liquid oils, imparting thereto a solid fat content and an increased melting point, as saturated fatty acids are solid at room temperature whereas unsaturated fatty acids are liquid at room temperature As a result, the oils which are naturally liquid can be transformed into a semi-solid fat with a particular melting profile. To provide maximum eating pleasure with this form of the fats, the hydrogenation process of these fats is highly controlled and allowed to proceed only partially, that is, to allow only some of the unsaturated fatty acids and/or bonds thereof to be reduced to the saturated form. These types of fats and fatty acids are called "partially hydrogenated fats" or "partially hydrogenated oils" or "partially hydrogenated fatty acids".

In addition to the reduction of the unsaturated fatty acids to the saturated form, in partial hydrogenation, a side reaction occurs in which the natural form of the unsaturated bond (referred to as a cis isomer) will twist in the plane, to form what is now referred to as a trans isomer of the bond of the of the unsaturated fatty acid.

Generally, cis isomers are those naturally occurring in food fats and oils. Although very small amounts of trans isomers occur in fats from ruminants or can result from the deodorization step in refining of vegetable fats and oils, most trans isomers result from the partial hydrogenation of fats and oils. Also, it is possible for the unsaturated bond to move laterally along the fatty acid chain and this is referred to as a positional isomer. These isomers are formed at the high temperatures (e.g., 180°–240° C.) common during the hydrogenation reaction and when the Nickel catalyst typically employed during the hydrogenation reaction unsuccessfully introduces a hydrogen atom to both sides of the unsaturated bond. These isomers are rather stable and will then remain unless the hydrogenation reaction is continued until there is a complete reduction of the unsaturated fatty acids. Therefore, partially hydrogenated fat will always contain some proportion of these positional and geometrical isomers; and, as discussed herein, those isomers can present problems.

For instance, typically, shortenings employed in bakery products may contain 15–25% trans isomers. The use of these isomers has become more scrutinized by nutritional science in the last several years. There have been clinical studies reporting observed negative health effects correlated to the presence of trans fatty acids formed during the partial hydrogenation of oils, e.g., a positive correlation with coronary heart diseases an increase in the ratio of plasma low density lipoproteins (LDL) to high density lipoproteins (HDL) and thus a possible increase in the risk of coronary heart disease (see, e.g., Elias, B. A., Food Ingredients Europe: Conference proceedings, London, October 1994 (Publisher: Process Press Europe, Maarssen); Willet, W. C. et al., Lancet 341 (8845); 581–585 (1993); Khosla, P. et al., J. Am. Col. of Nutrition, August 1996, 15(4):325–339 (American College of Nutrition, NY, N.Y.)).

Thus, a problem in the art is the use of partially hydrogenated fats and oils in foodstuff; and, a related problem is the need for a suitable replacement for partially hydrogenated fats and oils in foodstuff.

Fats or oils which contain naturally a sufficient amount of saturated fatty acids to form solids include palm oil, palm kernel oil, coconut oil, lard, and tallow.

However, in the U.S. the use of tropical fats or oils is basically limited to a few non-dairy and confectionery applications due to concerns relating to their naturally high content of short chain saturated fatty acids. Also the application of animal fats is restricted due to such issues religious dietary restrictions, e.g. rabinical law for kosher certification.

Thus, the problems presented by partially hydrogenated fats or oils cannot be addressed by merely employing naturally saturated fats or oils; and, the use of naturally saturated fats and oils present problems. It would be desirable to be able to employ naturally saturated fats or oils such as tropical fats or oils in more foodstuff, especially in more foodstuff in the U.S. than is currently typical, without triggering the bases for the concerns relating to their content of short chain saturated fatty acids.

Another possible replacement for partially hydrogenated fats or oils is interesterified fats based on liquid oils and fully hydrogenated fats. These interesterified fats are from a process wherein the fatty acids on the triglycerides of two fats are randomized, resulting in a triglyceride composition that can provide a suitable melting profile.

This option presents problems insofar as the food manufacturor or processor would be required to include the fully hydrogenated fat on the product label, and the ultimate consumer may likely associate trans isomers with the full or complete hydrogenation process, such that the food product would likely not be commercially successful.

Polyunsaturated fatty acids are considered a highly essential component of a healthy diet according to the U.S. Food and Nutritional Board's Recommended Dietary Allowances (tenth ed. 1989) (e.g., amound of dietary linoleic acid for humans should be a minimum of 2% of dietary calories and preferably 3%; and, the requirement for linolenic acid has been estimated to be 0.54% of calories)

While it would be desirable to replace partially hydrogenated fats simply with natural vegetable oils since natural vegetable oils have a relatively high ratio of polyunsaturated to saturated fatty acids, attempts to do this so far have also proven to be quite unsatisfactory in regard to either the processing or organoleptic (e.g., taste, texture, eating) aspects of the food product. For example, there may be insufficient oil retainment in the dough or batter resulting in separation of oil. Or, oils may depart from the food product too quickly in the mouth, imparting an off-taste and off-feel to the product as it is being consumed.

Another related problem in the preparation of food products is "bloom"; a phenomenon wherein certain fats or oils permeate to the surface of a food product, such as a cookie, and leave a scoring on the surface of the food product. This "bloom" renders the food product not visually appealing and ergo not consumable. It would be desirable to provide a shortening system which does not suffer from "bloom."

In the production of food surfactants or emulsifiers, a triglyceride is reacted with glycerol and to form a reaction product containing the desired product, the monoglycerides. Thus, the reaction product is typically subjected to a treatment to isolate a monoglycerides product from a diglycerides and triglycerides product; the diglycerides and triglycerides product is considered a by-product of the reaction of a triglyceride with a glycerol to obtain monoglycerides for surfactants or emulsifiers. The diglycerides and triglycerides product is sometimes discarded, or recycled back to a reactor wherein the reacting with glycerol is occurring so as to enhance the production of monoglycerides (see, e.g., Lauridsen, "Food Surfactants, Their Structure And Polymorphism Technical Paper TP 2-1e Danisco Ingredients, Braband Denmark, and references cited therein).

It would be desirable to provide alternative uses for this by product from emulsifier or surfactant preparation Systems functioning as or containing fats or oils have been proposed (see, e.g., CN 1078353, U.S. Pat. Nos. 5,458,910, 5,612,080, 5,254,356, 5,061,506, 5,215,779, 5,064,670, 5,407,695, 4,865,866, 4,596,714, 4,137,338, 4,226,894, 4,234,606, 4,335,157, 3,914,452, 3,623,888, DD 291240A). However, these systems have not sufficiently addressed the problems in the art; and, these systems have not been reported to provide the synergistic, and surprisingly superior properties, including improvement in organoleptic properties of foodstuff, of the present invention.

OBJECTS AND SUMMARY OF THE INVENTION

It is an object of the invention to provide any or all of: a shortening system; products containing or prepared with a shortening system; methods for making or using a shortening system; a shortening system which exhibits surprisingly superior or synergistic properties, e.g., when in a foodstuff; and, a shortening system which addresses any problem of prior shortening systems.

Accordingly, the present invention provides a shortening system comprising an admixture of at least one non-hydrogenated vegetable oil and at least one stearine fraction obtainable from glycerolysis/interesterification of a fat or oil. The stearine fraction is preferably obtained from glycerolysis/interesterification of a fat or oil.

The shortening system contains crystal matrices, imparts improved organoleptic properties and stability to foodstuff containing the shortening system, and has a conserved level of trans isomers with respect to the fat or oil prior to glycerolysis/interesterification. That is, the amount of trans isomers in the fat or oil is not increased by the glycerolysis/interesterification reaction; and, is not increased by admixing the stearine fraction with non-hydrogenated oil.

The invention provides a shortening system comprising an admixture of at least one non-hydrogenated vegetable oil and at least one monoglyceride and/or diglyceride, preferably at least one diglyceride and optionally also at least one monoglyceride, more preferably mono- and diglycerides. The at least one monoglyceride and/or diglyceride is preferably comprised predominantly of saturated acyl fatty acids, e.g., lauric, myristic, palmitic, stearic and combinations thereof.

The shortening system contains crystal matrices, imparts improved organoleptic properties and stability to foodstuff containing the shortening system, and has a conserved level of trans isomers.

That is, the stearine fraction can be comprised of mono- and diglycerides comprised predominantly of saturated acyl fatty acids, e.g., lauric, myristic, palmitic, stearic and combinations thereof. Further, the at least one monoglyceride and/or diglyceride can be a stearine fraction, i.e., normally solid at room temperature.

The stearine fraction or the at least one monoglyceride and/or diglyceride can be derived from natural food grade fats, preferably plant fats, such as coconut oil, palm oil, palm kernel oil, and the like, or fats that have been fully hydrogenated. Thus, in certain embodiments, the stearine fraction or the at least one monoglyceride and/or diglyceride is derived from naturally saturated fats or oils. A stearine fraction or at least one monoglyceride and/or diglyceride derived from palm oil is preferred.

Any suitable food grade non-hydrogenated vegetable oil, such as sunflower oil, soybean oil, corn oil, peanut oil, cottonseed oil, safflower oil, olive oil, and the like can be used in the invention. Liquid soybean oil is preferred.

For instance, the shortening system can contain by weight approximately 3% to approximately 15%, preferably approximately 5% to approximately 12%, advantageously approximately 5% to approximately 10%, more advantageously approximately 5% to approximately 8%, and more preferably approximately 6% of the stearine fraction or the at least one monoglyceride and/or diglyceride, and approximately 85% to approximately 97%, preferably approximately 88% to approximately 95%, advantageously approximately 90% to approximately 95%, more advantageously approximately 92% to 95%, and more preferably approximately 94% of the vegetable oil.

The inventive composition surprisingly exhibits a higher solids content or greater amount of crystals than expected from the sum of the individual components of the inventive compositions i.e., the inventive composition surprisingly exhibits a synergistic solids content or a synergistic amount of crystals, especially when employed in a foodstuff; and, this imparts to the foodstuff improved organoleptic properties and improved stability.

The stearine fraction or the at least one monoglyceride and/or diglyceride preferably has an enriched concentration of diglycerides, with respect to the glycerolysis of triglycerides; and, the invention further comprehends methods for preparing and using the inventive compositions of the invention, as well as foodstuff containing or having been prepared with compositions of the invention.

Thus, in a further embodiment the invention provides a method for preparing a shortening composition comprising admixing a stearine fraction obtainable from the glycerolysis/interesterification of a triglyceride or at least one monoglyceride and/or diglyceride, e.g., mono- and diglycerides from glycerolysis/interesterification, with vegetable oil.

In another embodiment the invention comprises a method for preparing a shortening composition comprising: subjecting a triglyceride to glycerolysis/interesterification; isolating a stearine fraction obtainable from the glycerolysis/interesterification, preferably a stearine fraction having an enhanced diglyceride concentration, and admixing the stearine fraction obtainable from the glycerolysis/interesterification of a triglyceride with vegetable oil.

An "enhanced" diglyceride concentration means that the reaction product from the glycerolysis/interesterification has not been subjected to further treatment commonly performed, such as solvent extraction, fractionation, e.g. using supercritical carbon dioxide, or molecular distillation or the like to isolate monoglycerides from diglycerides and triglycerides, such that the reaction product contains approximately 30 mol % to 40 mol % of each of monoglycerides and diglycerides with the remainder being made up of triglyceride and glycerol. This is a higher diglyceride concentration than typical since it is common to perform subject the reaction product to a treatment to isolate monoglycerides from diglycerides and triglycerides Alternatively, an "enhanced" diglyceride concentration can mean that the reaction product from the glycerolysis/interesterification has been subjected to further treatment to isolate a monoglycerides product from a diglycerides and triglycerides product, and the stearine fraction or the at least one monoglyceride and/or diglyceride is the diglycerides and triglycerides product after such an isolation treatment. In this instance, the stearine fraction or the at least one monoglycerides and/or diglycerides contains a higher concentration of diglycerides and a lower concentration of monoglycerides, relative to the reaction product, e.g., a monoglycerides concentration of up to approximately 18 mol % to approximately 23 mol %, advantageously up to approximately 20 mol % of monoglycerides; a triglycerides concentration of up to approximately 23 mol % to approximately 27 mol %, advantageously approximately 25 mol %; and, a diglycerides concentration of approximately 50 mol % to approximately 60 mol %, advantageously approximately 55 mol %.

Accordingly, it is preferred that the ester distribution in the stearine fraction or the at least one monoglyceride and/or diglyceride is: Monoester (monoglycerides): less than approximately 30 mol %, advantageously less than approximately 25 mol %, and more advantageously less than approximately 20 mol % and, diester (diglycerides): greater than approximately 40 mol %, advantageously greater than approximately 45 mol %, and more advantageously greater than 50 mol %.

It is typical in the preparation of emulsifiers from reacting a triglyceride with glycerol to subject the reaction product to a treatment to isolate a monoglycerides product from a diglycerides and triglycerides product; the monoglycerides product in such a preparation is considered the desired product, and the diglycerides and triglycerides product is considered a by-product, which, for instance, is sometimes discarded, or recycled back to a reactor wherein the reacting with glycerol is occurring so as to enhance the production of monoglycerides. Surprisingly, the present invention provides a use for that which was previously considered a by-product which needed to be recycled back to the reactor or discarded.

The stearine fraction or saturated acyl fatty acids can be concentrated by heating and cooling: Saturated compounds from the glycerolysis/interesterification are typically solid at room temperature and unsaturated compounds from the glycerolysis/interesterification are typically liquid at room temperature. Thus, by heating compounds from glycerolysis/interesterification, both the saturated and unsaturated compounds will become liquid and upon cooling, the saturated compounds can be separated out as they crystallize.

Accordingly, the method for preparing inventive compositions can comprise subjecting a triglyceride to glycerolysis/interesterification to obtain a reaction product; optionally separating a predominantly monoglycerides product and a predominantly diglycerides product from the reaction product; isolating a stearine fraction obtainable from the glycerolysis/interesterification reaction product or from the optional predominantly diglycerides product, preferably a stearine fraction having an enhanced diglyceride concentration, and preferably the isolated stearine fraction is concentrated by heating and crystallizing saturated compounds; and admixing the stearine fraction obtainable from the glycerolysis/interesterification of a triglyceride with vegetable oil.

The present invention further comprehends uses of the inventive shortening composition. For instance, the inventive shortening composition can be topically applied to a foodstuff such as a crackers e.g., by spraying, to stabilize the cracker. It has been observed that the inventive shortening composition improves the organoleptic properties of a foodstuff such as a cracker.

The inventive shortening system can be used in bakery products, e.g., bread, cookies, in place of partially hydrogenated shortenings. Thus, the present invention can address the problems of trans fatty acids and partially hydrogenated fats or oils in foods, as well as address the issue of a suitable replacement for partially hydrogenated fats or oils in foods. But moreover, in these food applications, the inventive composition demonstrates surprisingly superior properties.

Further, the inventive shortening system can be used as a delivery system for an emulsifier.

Thus, the invention comprehends a foodstuff containing the inventive shortening system or having been prepared with the inventive shortening system; and, the invention provides an emulsifier delivery system comprising the inventive shortening system.

The shortening system of the present invention provides improved organoleptic properties to foodstuff prepared with or containing the shortening system. For instance, when sprayed on crackers, the shortening system, possibly due to the synergistic amount of crystal matrices, does not "bleed off" the cracker as does other fats or oils such as vegetable oil when the cracker is placed on a surface; and, the shortening system does not separate too quickly in the mouth such that the cracker has better taste and feel in the mouth. Similarly, in baked goods, the shortening system does not permeate to the surface or "bloom."

By "does not 'bleed off'" is meant that the cracker or other foodstuff is placed on a paper towel for a period of time, such as overnight, and the cracker or foodstuff leaves a neglible oil print on the paper, similar to the print left by a cracker or other foodstuff prepared using a partially hydrogenated shortening for the same period of time.

Furthermore, the invention provides broader uses for naturally saturated fats or oils without presenting the issues raised by the presence therein of short chain saturated fatty acids by employing the stearine fraction, or at least one monoglyceride and/or diglyceride preferably saturated acyl fatty acid(s), derived therefrom as a minor component of the shortening system.

These and other embodiments are disclosed or are obvious from and encompassed by, the following Detailed Description.

DETAILED DESCRIPTION

The invention pertains to a shortening system and methods for making and uses of it.

It has now been found that the physical properties of liquid vegetable oils are surprisingly improved by the addition of minor levels of a crystal modifier, thereby providing improved organoleptic properties in foodstuff containing or prepared with the modified vegetable oil and maintaining the more favorable nutritional aspects of vegetable oil over the partially hydrogenated shortenings.

In the present invention mono- and diglycerides, mono- and diesters of fatty acids and glycerol, especially diglycerides (or a modifier having an enriched diglyceride concentration), advantageously mono- and diglycerides from saturated fats or oils such as vegetable fats or oils, and more advantageously, the stearine fraction of such mono- and diglycerides, provides crystal modification for vegetable oil.

Mono- and diglycerides are formed in the intestinal tract as a result of the normal digestion of triglycerides and are also found naturally in minor amounts in all vegetable oils. As a result they are generally recognized as safe (GRAS). In particular, the diesters, which are quite lipophilic, can co-crystallize within the triglyceride network of the liquid vegetable oil. Monoesters of glycerides have reduced solubility in fats and begin to crystallize at even higher temperatures (e.g., 120°–130° F.), providing crystal seeding.

For a preferred the proper mouth profile (organoleptic properties), the fatty acid profile for these mono- and diglycerides is preferably selected to allow the required processing stability and also the desired melting profile in the finished product as well. Thus, while there are many different sources for the stearine fraction obtainable from glycerolysis/interesterification of a fat or oil or for the at least one monoglyceride and/or diglyceride, e.g., mono- and diglycerides comprised predominantly of saturated acyl fatty acids, used in the inventive composition, e.g., lauric, myristic, palmitic, stearic and combinations thereof such as those derived from natural food grade fats, preferably plant fats, such as coconut oil, palm oil, palm kernel oil, and the like, or fats that have been fully hydrogenated, the skilled artisan, without undue experimentation from this disclosure and the knowledge in the art and the ultimate foodstuff in which shortening composition is to be employed can select a suitable source for the stearine fraction or for the mono- and diglycerides. For instance, a fully hydrogenated fat or a fat or oil having a high melting point could impart a waxy taste when used in a shortening composition according to the invention, especially if the shortening composition is ultimately used as a coating on a cracker. Accordingly, a stearine fraction obtainable from palm oil or a naturally saturated oil similar to palm oil is preferred in the practice of the invention.

Similarly, while many types of vegetable oils can be employed in the practice of the inventions the skilled artisan, without undue experimentation from this disclosure and the knowledge in the art and the ultimate foodstuff in which shortening composition is to be employed, can select an oil which does not impart undesirable flavor characteristics. For instance, olive oil may impart a flavor not desired for a cracker coating or a cookie. Accordingly, non-hydrogenated soybean oil is preferred in the practice of the invention.

Mono- and diglycerides can be commercially prepared from edible fats and oils of animal or vegetable origin. The manufacturing process involves a reaction of fat (triglycerides) and glycerin or glycerol:

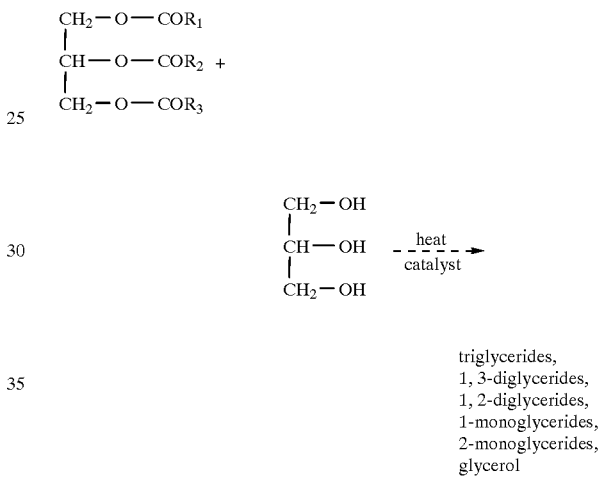

The reaction is carried out at approximately 200° C. (392° F.) in the presence of a catalyst such as an alkaline catalyst (see, e.g., Lauridsen, supra; Feuge and Bailey: Modification of Vegetable Oils. VI. The Practical Preparation of Mono- and Diglycerides. Oil and Soap 23:259–264 (1946)).

The reaction product is a mixture of mono- and diglycerides and triglycerides with minor quantities of free glycerol and free fatty acids, as depicted above and in Lauridsen, supra. The reaction mixture is then processed through to remove the remaining glycerol and to reduce the level of free fatty acids. The processing can comprise distillation. Thereafter, an acid is added to neutralize the catalyst. The degree of glycerolysis/interesterification upon equilibrium is determined by the ratio of triglycerides to glycerol.

In this invention, the reaction is preferably performed to provide a ester distribution in which: the monoester content is: less than 30% and advantageously less than 25% and more advantageously less than 20%, and the diester content is greater than 40% and advantageously greater than 45% and more advantageously greater 50%. Thus, in the preparation of an emulsifier or surfactant from glycerolysis/interesterification of a triglyceride, it is preferred to isolate or separate the monoester, e.g., by solvent extraction, fractionation, e.g., using supercritical carbon dioxide, or molecular distillation or the like from the reaction product, leaving a by-product which typically has an enhanced concentration of diglycerides. This by-product from the production of monoesters for use in emulsifiers or surfactants is useful in the practice of this invention. Accordingly, performing the reaction to obtain the desired ester distribution can be achieved by at least partially isolating or separating the monoester from the reaction product, as is done when an emulsifier or surfactant is being prepared, i.e., by utilizing that which was heretofore considered a by-product during the preparation of an emulsifier or surfactant.

In addition, prior to use in the invention, the mono- and diglycerides, e.g., the product having an enhanced concentration of diglycerides, can be subjected to heating and cooling to recrystallize the saturated compounds and obtain the stearine fraction thereof.

The mono- and diglycerides are preferably derived from vegetable oils consisting of a mixture of saturated acyl fatty acids including lauric, myristic, palmitic, and stearic in combination with a mixture of unsaturated fatty acids including oleic, linoleic, and/or linolenic. The origin of such fatty acids may include the natural fats such as coconut oil, palm oil, palm kernel oil, and/or the fats that have been fully hydrogenated. These fat sources are preferred due to the content of mainly natural cis isomers with only minor levels of trans isomers of unsaturated fatty acids (typically less than 1%).

Thus, the term "conserved" as used herein is with respect to the reaction for preparing the mono- and diglycerides and the blending to produce the inventive shortening composition not significantly or substantially increasing the amount of trans isomers present from those naturally present. Thus, the inventive shortening composition can be said to be appreciably free of positional and geometrical isomers. By avoiding the use of partially hydrogenated fat, the present invention avoids the problems of the positional and geometrical isomers which result from partial hydrogenation.

Accordingly, the inventive shortening composition is nutritionally superior to partially hydrogenated shortening as the inventive shortening composition contains only trace levels of either positional or geometric isomers of unsaturated fatty acids (typically less than 1%) and reduced levels of saturated fatty acids (typically less than 25%). Thus, the present invention is well-suited for chemically leavened or yeast-raised bakery products, as well as for cookies, crackers, and other applications where partially hydrogenated fats or oils are presently used.

The inventive shortening composition is prepared by the physical blending or admixing of the components (the non-hydrogenated vegetable oil and the mono- and diglycerides or the stearine fraction thereof), preferably with mechanical agitation. The mono- and diglyceride or stearine fraction thereof is preferably heated to an elevated temperature sufficient to provide liquidity, e.g., to within ±10° C. of the melting point, and is then added directly into the non-hydrogenated liquid vegetable oil. Blending is continued until the mono- and diglyceride or stearine fraction thereof is completely in solution, i.e., completely dissolved into the non-hydrogenated liquid vegetable oil. The inventive shortening composition can then be added directly into a foodstuff at this temperature, or cooled prior to use in a foodstuff, depending upon the use.

Thus, after preparation, the inventive shortening composition can be stored at a temperature to maintain it in a liquid state, i.e., to maintain the solution; and it can be used directly in the preparation of a foodstuff at or below the temperature required to maintain the solution. In addition, the liquid state of the inventive shortening composition can be rapidly cooled to a temperature of about 65–90° F. (about 18°–32° C.) to initiate the formation of dispersed fat crystals in the oil prior to adding to other ingredients of a foodstuff.

The inventive shortening composition can be used with any desired antioxidant system, such as tocopherol, TBHQ, BHT, or propyl gallate, alone or in combination with metal scavengers such as citric acid, phosphoric acid, EDTA and the like, to increase the stability of the shortening system against oxidative reactions.

The shortening composition of the invention can be used instead of conventional partially hydrogenated fats or oils in various types of foodstuff; and, can be used as a delivery system for an emulsifier.

For use as a delivery system for food emulsifiers, the inventive shortening composition is typically combined by physical blending (admixing) with the emulsifier. Typical emulsifiers which can be blended with the shortening system include lecithin, Diacetylated tartaric acid esters of mono-diglycerides (DATEM), sodium stearoyl lactylate (SSL) and the like (see, e.g., N. Krog, "Interactions of Surface-Active Lipids With Water, Protein and Starch Components In Food Systems," Technical Paper TP 3-1e, Danisco Ingredients, Braband, Denmark). And thus, the invention comprehends an emulsifier delivery system comprising: an inventive shortening system admixed with an emulsifier, e.g., comprising: non-hydrogenated vegetable oil, mono- or diglycerides or a stearine fraction thereof from glycerolysis/interesterification of triglycerides, preferably saturated triglycerides, and an emulsifier. The amount of emulsifier used is the same as the amount of emulsifier typically used when shortening is a vehicle for delivery of an emulsifier; and, the skilled artisan can arrive at a suitable amount of emulsifier for use in this aspect of the invention, without undue experimentation, from this disclosure and the knowledge in the art.

A better understanding of the present invention and of its many advantages will be had from the following examples, given by way of illustration.

EXAMPLES

Example 1

Typical Fatty Acid Profiles

The fatty acid profile for an inventive shortening composition of 92 parts by weight fully refined soybean oil and 8 parts by weight mono- and diglyceride based on palm oil (stearine fraction) would typically consist of:

saturated fatty acids 18% monounsaturated fatty acids 24% polyunsaturated fatty acids 58% positional, geometric isomers trace

The fatty acid profile for another inventive shortening based on 85 parts by weight fully refined soybean oil and 15 parts by weight of this mono- and diglyceride based on palm oil (stearine fraction) would consist of:

saturated fatty acids 22% monounsaturated fatty acids 24% polyunsaturated fatty acids 54% positional, geometric isomers trace

Both of these shortening compositions have a very favorable ratio of polyunsaturate to saturate (greater than 2.4) and a favorable ratio of polyunsaturate to saturate+positional, geometrical isomers of greater than 2.4.

In comparisons the fatty acids profile for the typical partially hydrogenated shortening that would be incorporated as a spray oil could consist of:

saturated fatty acids 20–30% monounsaturated fatty acids 35–45% polyunsaturated fatty acids 10–20% positional, geometric isomers 15–30%

Such shortenings have less favorable ratios of polyunsaturate to saturate (less than 1) and an even less favorable ratio of polyunsaturate to saturate+positional geometrical isomers (less than 0.5). The saturates and the geometrical/positional isomers represent a major fraction of the oil (greater than 35%).

The inventive shortening compositions in this Example, upon temperature reduction, form a suspension of crystals providing texture and mouthfeel enhancement to said bakery applications.

Example 2

Cookie Dough

Fats and shortenings are incorporated in doughs to shorten the texture so that the finished products are less firm. During the mixture of a dough there is competition for the flour surface between the aqueous phase and the fat. The aqueous phase interacts with the flour protein to create gluten which forms a cohesive and extensible network. However when the surface of the flour is coated with fat, absorption is reduced and a less cohesive gluten network is formed. In this sense, the fat serves to shorten the texture.

To evaluate an inventive shortening containing liquid refined soybean oil (86 parts by weight) combined with mono- and diglycerides based on palm oil (14 parts by weight), as in Example 1 (except that parts by weight of components varied) a model formulation for sugar cookies was prepared. The shortening was prepared by physically blending both molten components with mechanical agitation to a temperature of 120° F. The molten blend was then passed through a scrap surface heat exchanger and cooled to a temperature of 75° F. and then tempered for 1 hour with gentle agitation to form a crystal network. The crystallized liquid shortening was then incorporated within the cookie dough formulation.

| | Formulation Sugar Cookie | |
|---|---|---|
| Ingredients | | grams |
| group 1 | NFDM (nonfat dry milk powder) | 2.25 |
| | salt | 2.81 |
| | soda (sodium bicarbonate) | 2.25 |
| | FGS (sucrose, fine granulation) | 94.50 |
| | shortening at ambient temperature | 90 |
| group 2 | ammonium bicarbonate | 1.13 |
| | high fructose corn syrup (HFCS) | 3.38 |
| | water | 49.5 |
| group 3 | flour | 225 |

The mixing procedure for these groups was as follows:

STAGE 1 group 1 blend dry ingredients (NFDM, salt, soda, FGS) add to fat, and mix in Hobart mixer 3 minutes at low speed, scrape paddle and sides of bowl after each minute of mixing.

STAGE 2 group 2 dissolve ammonium bicarbonate in tap water to form a first solution, add first solution to HFCS to form second solution, add second solution to product from stage 1, group 1 mixing procedure, mix 1 min at low speed, scraping bowl and paddle after each 30 sec., and mix 2 min at med. speed, scraping bowl and paddle after each 30 sec.

STAGE 3 group 3 add flour to product from stage 2, group 2, mixing procedure, fold into liquid mixture 3 times, and mix 2 minutes low speed, scraping bowl and paddle after each 30 sec.

After mixing was complete, the dough was allowed to sit for 10 minutes to observe oil retention. Thereafter, the dough was sheeted out to a thickness of 7 mm with a rolling pin and gauge bars. Using a round cutter (60 mm), the cookies pieces were placed on an aluminum baking sheet and baked at 400° F. for 12 minutes. After baking, the cookies were allowed to cool to ambient temperature. The cookies were then evaluated for organoleptic properties (texture/flavor release) and oil retention.

Observations

Upon resting the mixed dough for 10 minutes, small amounts of liquid oil could be observed at the base of the pan. Even with this minor separation, the dough maintained good rheological properties for sheeting and cutting. The finished cookies had short texture and good flavor release. Cookies placed on a paper towel overnight left neglible oil prints on the paper, similar to the prints left by a partially hydrogenated shortening.

Example 3

Savory, Snack Crackers

Shortenings are employed both in the formulation of snack crackers and as a coating on the surface of the crackers after baking. Immediately after baking while the crackers are still hot, shortening (spray oil) is topically applied to the entire surface on a weight basis of 10–20%. This spray oil serves to improve and preserve the cracker's mouth profile concerning texture/flavor release; and, of course, its overall appearance. Generally, partially hydrogenated oils are employed as opposed to non-hydrogenated oils due to the presence of solid fat or crystals which entrap liquid oil. Crackers sprayed simply with non-hydrogeneated oils can be characterized as very oily to the touch when removing from the packaging. In addition, the mouthfeel of these crackers seems somewhat dry and brittle and the flavor release seems quick as the liquid oil releases immediately from the surface.

To evaluate an inventive shortening composition containing liquid refined soybean oil (93 parts) combined with mono- and diglyceride based on palm oil (7 parts) as in Example 1 (except that proportions of components varied), a model formulation for buttery snack crackers was prepared. The shortening was prepared by physically blending both molten components with mechanical agitation to a temperature of 120° F. The crackers were first formulated with the shortening and then after baking, the shortening was applied as a spray oil.

| Formulation Buttery Snack cracker | | |
|---|---|---|
| Ingredients | | grams |
| group 1: | Shortening | 30 |
| | fine granulated sugar | 23 |
| | high fructose corn syrup | 10 |
| | salt | 5 |
| | water | 160 |
| | butter flavor | 2 |
| group 2: | flour | 500 |
| | sodium bicarbonate | 6 |
| | calcium phosphate | 4 |
| group 3: | ammonium bicarbonate | 6 |

The mixing procedure was as follows:

STAGE 1
group 1
In a water jacketed mixing bowl with paddle, add and mix all of group 1 reserving a small portion of the water to dissolve ammonium bicarbonate. Mix for 3 minutes at low speed.
STAGE 2
group 2
Add flour, soda and calcium phosphate to the product from stage 1, and jog mixer for 30 seconds at low speed.
STAGE 3
group 3
Add ammonium bicarbonate dissolved in remaining water to the product from stage 2, and mix for 6–8 minutes at low speed; scraping down sides of mixing bowl after each 1 minute.

The sheeting and cutting and baking was as follows:
1. After proofing, the product from stage 3 was sheeted on a Rondo Sheeter at #12 setting; and passed through 3 times. Thereafter, the product was sheeted once at the following settings, gradually reducing the thickness of the dough.
   #10
   #7
   #5 turn 9°
   #3
   Finish at #1 or ¾
2. Stamp out cracker pieces so that 10 pieces weigh approximately 35 grams.
3. Place cracker pieces on hot wire mesh band. Bake at 400° F. for 4 minutes or until a golden brown color is obtained with a final moisture content of 2–3%
4. The spray oil is then applied in molten form at a temperature of 120° F. by a spray atomizer at a level of 18% based on a total weight of cracker.
5. The crackers are then allowed to cool on a rack and then packaged in plastic liners.

Observations

Upon evaluation, the crackers incorporating the inventive shortening based on non-hydrogenated oil and a mono-diglyceride stearine fraction had a uniform appearance and were semi-dry to the touch. Both the mouthfeel and the flavor release provided a pleasant eating experience.

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. A shortening system comprising an admixture of at least one non-hydrogenated vegetable oil and at least one isolated stearine fraction obtainable from glycerolysis/interesterification of a fat or oil, wherein the isolated stearine fraction has an enhanced concentration of diglycerides.

2. The shortening system of claim 1 wherein the stearine fraction is derived from a natural food grade fat.

3. The shortening system of claim 2 wherein the food grade fat is a saturated fat.

4. The shortening system of claim 2 wherein the food grade fat is a plant fat.

5. The shortening system of claim 4 wherein the plant fat is selected from the group consisting of coconut oil, palm oil, palm kernel oil, and fats that have been fully hydrogenated.

6. The shortening system of claim 5 wherein the plant fat is palm oil.

7. The shortening system of claims 1 wherein the vegetable oil is selected from the group consisting of sunflower oil, soybean oil, corn oil, peanut oil, cottonseed oil, safflower oil, and olive oil.

8. The shortening system of claim 7 wherein the vegetable oil is soybean oil.

9. The shortening system of claims 1 wherein the vegetable oil is present in an amount of approximately 85% to approximately 97% parts by weight.

10. The shortening system of claim 9 wherein the vegetable oil is present in an amount of approximately 88% to approximately 95% parts by weight.

11. The shortening system of claim 10 wherein the vegetable oil is present in an amount of approximately 90% to approximately 95% parts by weight.

12. The shortening system of claim 11 wherein the vegetable oil is present in an amount of approximately 92% to 95% parts by weight.

13. The shortening system of claim 12 wherein the vegetable oil is present in an amount of approximately 94% of parts by weight.

14. The shortening system of claim 1 wherein the stearine fraction is present in an amount of approximately 3% to approximately 15% by weight.

15. The shortening system of claim 14 wherein the stearine fraction is present in an approximately 5% to approximately 12% by weight.

16. The shortening system of claim 15 wherein the stearine fraction is present in an amount of approximately 5% to approximately 10% by weight.

17. The shortening system of claim 16 wherein the stearine fraction is present in an amount of approximately 5% to approximately 8% by weight.

18. The shortening system of claim 17 wherein the stearine fraction is present in an amount of approximately 6% by weight.

19. The shortening system of claim 1 wherein the isolated stearine fraction has a diglyceride concentration of about 50–60 mol %.

20. The shortening system of claim 19 wherein the isolated stearine fraction has a diglyceride concentration of about 55%.

21. A foodstuff containing or having been prepared with a shortening system as claimed in claim 1.

22. The foodstuff of claim 21 which is a cookie or cracker.

23. An emulsifier system comprising the shortening system of claim 1 and an emulsifier.

24. A foodstuff containing or having been prepared with the emulsifier system of claim 23.

25. A vehicle for delivery of an emulsifier comprising the shortening system of claim 1.

26. A method for preparing a shortening system comprising: subjecting a triglyceride to glycerolysis/interesterification; isolating a stearine fraction obtainable from the glycerolysis/interesterification having an enhanced diglyceride concentration, and admixing the isolated stearine fraction having an enhanced diglyceride concentration with vegetable oil.

27. The method of claim 26 wherein the isolating is of a stearine fraction having a diglyceride concentration of about 50–60 mol %.

28. The method of claim 27 wherein the isolating is of a stearine fraction having a diglyceride concentration of about 55 mol %.

29. A method for preparing a vehicle for delivery of an emulsifier comprising admixing a shortening system and the emulsifier, wherein the shortening system comprises an admixture of at least one non-hydrogenated vegetable oil and at least one isolated stearine fraction obtainable from glycerolysis/interesterification of a fat or oil, wherein the isolated stearine fraction has an enhanced concentration of diglycerides.

30. The method of claim 29 wherein the isolated stearine fraction has a diglyceride concentration of about 50–60 mol %.

31. The method of claim 30 wherein the isolated stearine fraction has a diglyceride concentration of about 55 mol %.

32. A method for preparing a shortening system comprising: subjecting a triglyceride to glycerolysis/interesterification to obtain a reaction product; isolating a predominantly diglycerides stearine fraction product from the reaction product; and admixing the isolated predominantly diglycerides stearine fraction product with vegetable oil.

33. The method of claim 32 wherein the isolating is of a stearine fraction having a diglyceride concentration of about 50–60 mol %.

34. The method of claim 33 wherein the isolating is of a stearine fraction having a diglyceride concentration of about 55 mol %.

35. A method for preparing an emulsifier system comprising admixing a shortening system and an emulsifier wherein the shortening system comprises an admixture of at least one non-hydrogenated vegetable oil and at least one isolated stearine fraction obtainable from glycerolysis/interesterification of a fat or oil, wherein the isolated stearine fraction has an enhanced concentration of diglycerides.

36. The method of claim 35 wherein the isolated stearine fraction has a diglyceride concentration of about 50–60 mol %.

37. The method of claim 36 wherein the isolated stearine fraction has a diglyceride concentration of about 55 mol %.

* * * * *